US012628723B2

(12) United States Patent
Di Cecilia et al.

(10) Patent No.: US 12,628,723 B2
(45) Date of Patent: May 19, 2026

(54) AUTONOMOUS CONTROL SYSTEM OF A WEEDING TOOL CONNECTED TO AN AGRICULTURAL VEHICLE

(71) Applicant: CNH Industrial Italia S.p.A., Turin (IT)

(72) Inventors: Luca Di Cecilia, Modena (IT); Nicola Lenzini, Modena (IT)

(73) Assignee: CNH INDUSTRIAL ITALIA S.P.A., Turin (IT)

( * ) Notice: Subject to any disclaimer, the term of this patent is extended or adjusted under 35 U.S.C. 154(b) by 92 days.

(21) Appl. No.: 18/840,836

(22) PCT Filed: Jan. 27, 2023

(86) PCT No.: PCT/EP2023/052065
§ 371 (c)(1),
(2) Date: Aug. 22, 2024

(87) PCT Pub. No.: WO2023/160943
PCT Pub. Date: Aug. 31, 2023

(65) Prior Publication Data
US 2025/0194455 A1     Jun. 19, 2025

(30) Foreign Application Priority Data

Feb. 23, 2022    (IT) ........................ 102022000003395

(51) Int. Cl.
*G01S 13/89*          (2006.01)
*A01B 79/00*          (2006.01)
(52) U.S. Cl.
CPC ............ *A01B 79/005* (2013.01); *G01S 13/89* (2013.01)

(58) Field of Classification Search
CPC ....... A01B 79/005; A01B 69/00; G01S 13/89; G05D 1/00
See application file for complete search history.

(56) References Cited

U.S. PATENT DOCUMENTS

| | | |
|---|---|---|
| 10,255,670 B1 | 4/2019 | Wu et al. |
| 2011/0137456 A1 | 6/2011 | Koselka et al. |

(Continued)

OTHER PUBLICATIONS

IZARD "Development and Field Testing of LiDAR Applications in Agricultural Mobile Vehicles: Safety, In-Row Tree Evaluation and Crop Assessment," 2015, 247 pgs.

(Continued)

*Primary Examiner* — Tan Q Nguyen
(74) *Attorney, Agent, or Firm* — Fletcher Yoder, P.C.

(57) ABSTRACT

An autonomous control system of a weeding tool is connected to an agricultural vehicle. The weeding tool is configured to assume a weeding condition and a retracted condition. The autonomous control system includes a 3D sensor associated with a front part of the agricultural vehicle and configured to acquire a point cloud corresponding to a scenario in front of the agricultural vehicle, and an electronic control unit configured to cyclically generate a map of poles and/or trunks detected by the 3D sensor using the point cloud, command the weeding condition of the weeding tool in response to determining the distance between the weeding tool and a pole and/or trunk is greater than a threshold distance, and command the retracted condition of the weeding tool in response to determining the distance is less than or equal to the threshold distance.

9 Claims, 3 Drawing Sheets

(56)          References Cited

U.S. PATENT DOCUMENTS

| | | | |
|---|---|---|---|
| 2019/0239502 A1* | 8/2019 | Palomares | G05D 1/0246 |
| 2020/0029488 A1* | 1/2020 | Bertucci | G06F 18/2113 |
| 2020/0029489 A1 | 1/2020 | Bertucci et al. | |
| 2020/0077588 A1 | 3/2020 | Salim et al. | |
| 2021/0105995 A1* | 4/2021 | Palomares | A01B 39/18 |
| 2021/0243940 A1* | 8/2021 | Snyder | A01M 21/02 |

OTHER PUBLICATIONS

IT Application No. IT 202200003395 Search Report dated Oct. 17, 2022, 9 pgs.
PCT Application No. PCT/EP2023/052065 International Search Report dated Mar. 16, 2023, 11 pgs.

* cited by examiner

AUTONOMOUS CONTROL SYSTEM OF A WEEDING TOOL CONNECTED TO AN AGRICULTURAL VEHICLE

CROSS-REFERENCE TO RELATED APPLICATIONS

This application is a national stage of PCT Application No. PCT/EP2023/052065, entitled "Autonomous Control System of a Weeding Tool Connected to an Agricultural Vehicle", filed Jan. 27, 2023, which claims priority from and the benefit of IT application Ser. No. 10/202,2000003395, filed Feb. 23, 2022. Each of the foregoing applications is hereby incorporated by reference in its entirety.

FIELD OF THE INVENTION

The present invention relates to an autonomous control system of a work tool connected to an agricultural vehicle.

STATE OF THE ART

In extensive crops, weeding represents a significant problem. Weeding can be carried out chemically, by means of herbicides, or mechanically by hand or by means of operating machines controlled by man.

In extensive crops, the mechanical removal of weeds represents a significant problem, especially where the use of herbicides is limited and not recommended.

Tools are known which are suitable for being associated with the front or rear part of an agricultural vehicle and able to extend laterally to weed the ground. However, the distension, work and retraction operations are controlled by a human operator who monitors the activity. It is necessary to pay close attention to avoid causing the tool to collide with the trunk of a plant or with a support pole of a plantation. Therefore, the time it takes to weed the land on which extensive plantings insist is extremely relevant.

The implementation of a contact sensor is known, placed laterally to the weeding tool, which activates a mechanical retraction mechanism of the tool. However, the inertia of the vehicle and the retraction speed of the tool are such that often the trunk of the plants is still damaged.

The implementation of autonomous vision systems is known to control the motion of agricultural workers within a plantation, for example to harvest fruit.

The need is felt to automate mechanical weeding performed with tools associated with an agricultural vehicle such as a tractor.

If not specifically excluded in the detailed description that follows, what is described in this chapter is to be considered as an integral part of the detailed description.

SUMMARY OF THE INVENTION

The object of the present invention is to present an automatic control method of a weeding tool associated with an agricultural vehicle.

The basic idea of the present invention is to combine a 3D sensor (RADAR, LiDAR, stereo camera) in combination with a GPS system to

- generate a map of poles and/or trunks detected by the 3D sensor using said pointcloud,
- georeferencing said poles and/or trunks on the basis, at least, of a position acquired by said geolocation means,
- identify the pole and/or trunk closest to the tool e

- calculate a distance between the tool and the closest pole and/or trunk e
- command a weeding condition of the implement when said distance is greater than a predetermined threshold and command a retraction condition of the implement when said distance is less than or equal to said predetermined threshold.

The threshold is preferably selected according to the speed of advancement of the vehicle and the retraction time of the weeding tool.

The GPS receiver generally provides not only the terrestrial coordinates, but also the so-called heading that is the direction of movement of the vehicle, which can be an input to the algorithm in question.

In addition, the vehicle trajectory can be accounted to better control the retraction of the tool.

The trajectory of the vehicle can be identified:
- monitoring a vehicle steering angle over time and/or
- using inertial units (IMU) and performing an integral type calculation on the measured accelerations, using known filtering techniques (e.g. extended Kalman filter) and/or
- monitoring the speed of the vehicle over time and/or
- acquiring geolocalized positions and heading (azimuth) of the vehicle in a previous interval, in order to extrapolate the trajectory of the vehicle.

However, in the hypothesis that the vehicle moves within a row, it must necessarily be assumed that the vehicle moves parallel to the row itself, even when this is not perfectly straight. This means that when this method is implemented, the trajectory represents optional, non-essential information. In fact, from the position of the GPS antenna and from the directional vision of the 3D radar it is possible to georeference obstacles and estimate the position of the tool with respect to them.

Once the trajectory of the vehicle is known, it is possible to accurately estimate the future position of the same vehicle with respect to the position of the poles and trunks acquired through the 3D sensor and in particular it is possible to estimate the position of the tool with respect to the poles and trunks taking into account the speed of the vehicle. Therefore, once the position of the tool is known, its retraction is commanded when this is below the aforementioned threshold.

The dependent claims describe preferred variants of the invention, forming an integral part of this description.

BRIEF DESCRIPTION OF THE FIGURES

Further objects and advantages of the present invention will become clear from the following detailed description of an example of its embodiment (and its variants) and from the attached drawings given purely by way of non-limiting explanation, in which.

The same reference numbers and letters in the figures identify the same elements or components.

In the context of this description, the term "second" component does not imply the presence of a "first" component. These terms are in fact used as labels to improve clarity and should not be understood in a limiting way.

The elements and features illustrated in the various preferred embodiments, including the drawings, can be combined with each other without however departing from the scope of this application as described below.

DESCRIZIONE DI DETTAGLIO DI ESEMPI DI REALIZZAZIONE

Figure 1:
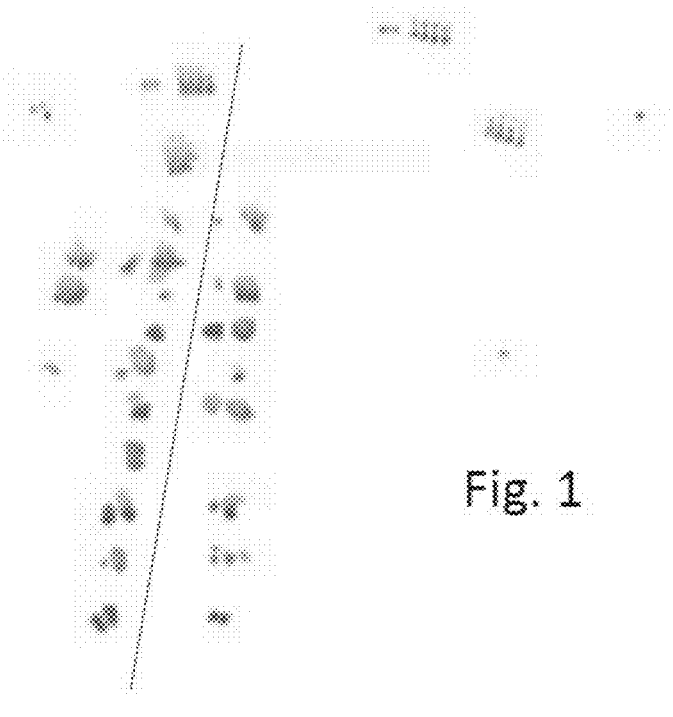
FIG. 1 shows a map of trunks and poles acquired by means of a radar, on which a vehicle trajectory is superimposed.
Figure 2:
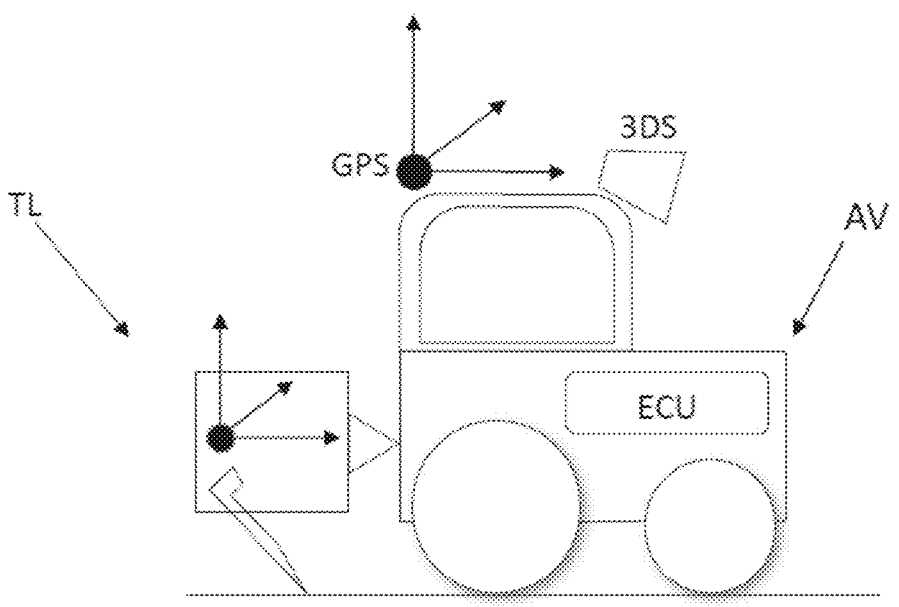
FIG. 2 shows a side view of an example of the agricultural vehicle according to the present invention to which a weeding tool is associated and configured to produce the map of FIG. 1.

With reference to FIG. 2, where an agricultural vehicle AV is shown to which at least one 3D sensor capable of generating a pointcloud is associated, arranged in such a way as to scan (optically or electromagnetically) the environment in front of the vehicle, inside the own field of view (FoV).

The pointcloud is a 3D representation of the scanned environment in front of the vehicle, and therefore contains 3D points representing the poles and trunks in the field. These points of the pointcloud also correspond to poles and/or trunks of the plantation, such as a vineyard or an orange grove, etc. . . .

The vehicle is also equipped with a GPS geolocation system and processing means connected with the geolocation system and configured to calculate the vehicle's global coordinates, speed and direction of movement of the vehicle.

Alternatively, or in combination, the processing means are configured to acquire a vehicle speed by means of a sensor and a steering angle of the wheels.

In both variants, the processing means are preferably configured to extract/calculate the trajectory of the vehicle. Thanks to this information it is possible to establish a reciprocal position of the poles and/or trunks detected with respect to the vehicle and therefore, a map of them with respect to the vehicle is generated.

When the vehicle is equipped with a geolocation system, each pole and/or trunk is georeferenced on the map, knowing the geographical position of the vehicle.

The vehicle is also equipped with a tool TL for weeding, it is generally associated with a front or rear part of the vehicle.

Once the distance between the tool and the GPS system is known and the vehicle's trajectory known, it is also possible to georeference the tool and thus, as the vehicle advances detects the presence of further poles and/or trunks, calculates a mutual distance between the poles and/or trunks closest to the tool e commands the retraction of the tool when this distance is less than a predetermined threshold and the distension of the tool when this distance exceeds that predetermined threshold.

Figure 3:
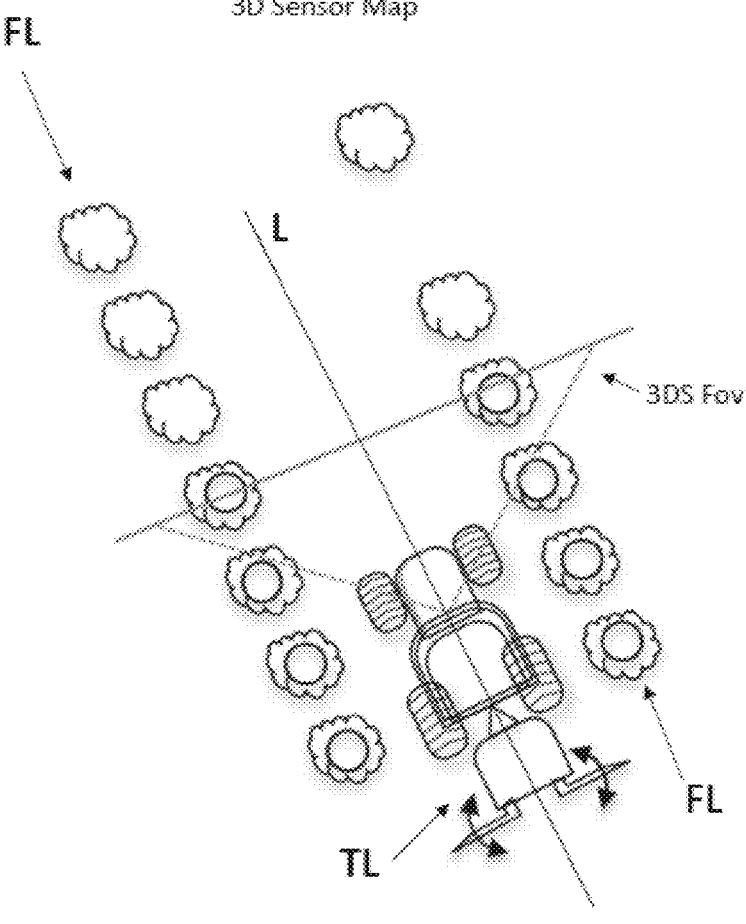
FIG. 3 shows a top view of the agricultural vehicle of FIG. 2 in an operating condition.
Figure 4:
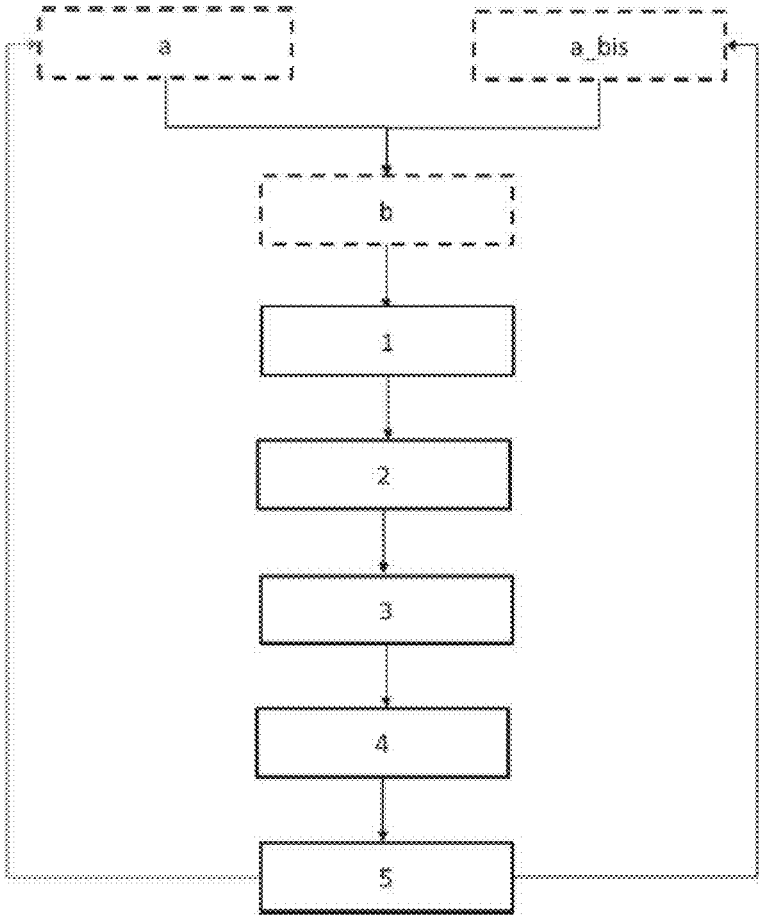
FIG. 4 shows an exemplary flow chart of the method object of the present invention. Dashed blocks are optional.

FIG. 3 shows the agricultural vehicle AV advancing according to a median trajectory between two aligned rows FL.

The pointcloud is composed of voxels (3D pixels) which correspond to elements present in the field of view of the 3D sensor. Each voxel has a 3D coordinate (x, y, z) which is associated with the vehicle's GPS coordinates, once the relative position between the 3D sensor and the GPS antenna is known. This allows to obtain a geolocalized map, which is used to perform a mapping. Subsequent acquisitions are partially overlapped (assuming that the tractor moves in space, otherwise everything would be perfectly superimposable as they are identical) and thus a map of space is created: this space represents both parts of the field in which the vehicle has already passed, and parts fields that are in front of it, within the sensor's field of view.

By exploiting this mapping function, thanks to the present invention, the extended/retracted condition of the implementation tool is optimally controlled, eliminating the risk of impacting against poles and/or trunks.

In summary, the method can be summarized as the cyclical execution of the following steps:

(Step 1) generation of a map of piles and/or trunks detected by means of said pointcloud, (Step 2) georeferencing of said poles and/or trunks on the basis, at least, of a position acquired by said geolocation means, (Step 3) identification of the pole and/or trunk closest to the tool e (Step 4) calculation of a distance between the tool and the closest pole and/or trunk e (Step 5) command of a weeding condition of the implement when said distance is greater than a predetermined threshold and of a retraction condition of the implement when said distance is less than or equal to said predetermined threshold.

Preliminarily to these steps, the following steps are preferably performed:

(Step a) acquisition of two or more previous positions of the vehicle and estimation of said trajectory on the basis of the two or more positions acquired, and/or (Step a_bis) acquisition of steering angle measurements and estimation of said trajectory on the basis of the acquired measurements and then (Step b) extraction from the pointcloud acquired by the 3D sensor, and possible filtering of unwanted reflections and removal of points relating to the ground plane. Therefore, the georeferencing of each of said poles and/or trunks on the basis of the position of the vehicle with respect to the map acquired by the 3D sensor, is preferably also carried out as a function of a position of corresponding reflections of the pole or trunk.

The present invention can be advantageously implemented by means of a computer program, which comprises coding means for carrying out one or more steps of the method, when this program is executed on a computer. Therefore, it is intended that the scope of protection extends to said computer program and further to computer readable means comprising a recorded message, said computer readable means comprising program coding means for carrying out one or more steps of the method, when said program is run on a computer.

Implementation variants of the described non-limiting example are possible, without however departing from the scope of protection of the present invention, including all the equivalent embodiments for a person skilled in the art, to the content of the claims.

From the above description, the person skilled in the art is able to realize the object of the invention without introducing further construction details.

The invention claimed is:

1. An autonomous control system of a weeding tool connected to an agricultural vehicle, wherein the weeding tool is configured to assume a weeding condition and a retracted condition, the weeding condition includes a distension of the weeding tool in a direction approximately lateral to a longitudinal development of the agricultural vehicle, and the autonomous control system includes:

a 3D sensor associated with a front part of the agricultural vehicle and configured to acquire a point cloud corresponding to a scenario in front of the agricultural vehicle;

a geolocation device configured to cyclically acquire a position of the agricultural vehicle;

an electronic control unit configured to cyclically:

generate a map of poles, trunks, or a combination thereof, detected by the 3D sensor using the point cloud;

georeference the poles, the trunks, or the combination thereof, on the basis, at least, of the position of the agricultural vehicle acquired by the geolocation device;

identify the pole or the trunk closest to the weeding tool;

determine a distance between the weeding tool and the closest pole or trunk; and command the weeding condition of the weeding tool in response to determining the distance is greater than a threshold distance, and command a retraction the retracted condition of the weeding tool in response to determining the distance is less than or equal to the threshold distance.

2. The autonomous control system according to claim 1, further comprising an estimation system comprising the electronic control unit, wherein the estimation system is configured to estimate a vehicle trajectory, and the electronic control unit is configured to determine the distance between the weeding tool and the closest pole or trunk as a function of the vehicle trajectory.

3. The autonomous control system according to claim 2, wherein the estimation system comprises;

a steering sensor configured to measure a steering angle, wherein the electronic control unit is operatively connected to the steering sensor and configured to estimate the vehicle trajectory on the basis of the steering angle; or the geolocation device.

4. A method of autonomous control of a weeding tool connected to an agricultural vehicle, wherein the weeding tool is configured to assume a weeding condition and a retracted condition, the weeding condition includes a distension of the weeding tool in a direction approximately lateral to a longitudinal development of the agricultural vehicle, and an autonomous control system includes:

a 3D sensor associated with a front part of the agricultural vehicle and configured to acquire a point cloud corresponding to a scenario in front of the agricultural vehicle;

a geolocation device configured to cyclically acquire a position of the agricultural vehicle;

the method comprising the following steps in cyclic succession:

generating a map of poles, and/or trunks, or a combination thereof, detected by the 3D sensor using the point cloud;

georeferencing the poles, the trunks, or the combination thereof, on the basis, at least, of the position of the agricultural vehicle acquired by the geolocation device;

identifying the pole or the trunk closest to the weeding tool;

determining a distance between the weeding tool and the closest pole or trunk; and commanding the weeding condition of the weeding tool in response to determining the distance is greater than a threshold distance, and commanding the retracted condition of the weeding tool in response to determining the distance is less than or equal to the threshold distance.

5. The method according to claim 4, further comprising a preliminary step of:

acquiring two or more positions of the agricultural vehicle; and estimating a vehicle trajectory of the agricultural vehicle and determining the distance between the weeding tool and the closest pole or trunk based on the vehicle trajectory.

6. The method according to claim 4, further comprising a preliminary step of:

acquiring steering angle measurements;

estimating a vehicle trajectory based on the acquired steering angle measurements; and determining the distance between the weeding tool and the closest pole or trunk based on the vehicle trajectory.

7. A computer program comprising program coding configured to carry out all the steps of claim 4, when the computer program is run on a computer.

8. A computer readable media comprising a recorded program, the computer readable media comprising program coding configured to perform all steps of claim 4, when the program coding is configured to be run on a computer.

9. The agricultural vehicle comprising the weeding tool connected to the agricultural vehicle and the autonomous control system of the weeding tool according to claim 1.

\* \* \* \* \*